Feb. 18, 1969   C. H. HARVEY   3,428,366

FLOW CONTROL ARRANGEMENT

Filed May 19, 1967

INVENTOR
CHARLES H. HARVEY 3,428,366
FLOW CONTROL ARRANGEMENT
Charles H. Harvey, Groves, Tex., assignor to Gulf
  Oil Corporation, Pittsburgh, Pa., a corporation of
  Pennsylvania
      Filed May 19, 1967, Ser. No. 639,830
U.S. Cl. 302—42                                11 Claims
Int. Cl. B65g 53/40

ABSTRACT OF THE DISCLOSURE

A flow control arrangement comprising a channeled flow regulating gate which may be slidably moved from a "flow control" to a "clean-up" position without interruption of flow is provided for the continuous feeding of finely divided solids such as cracking catalysts to a solids circulation system in an essentially uninterrupted manner.

In the "clean-up" position, the gate is withdrawn from the flow path of solids and the channeled portion thereof may be aligned with a high pressure gas source for removal of plugging material from the channel.

Background of the invention

Fluidized particle contacting systems are employed in the catalytic cracking of hydrocarbons, such as gas oils and the like, to provide high grade motor fuels. In a typical fluidized hydrocarbon conversion system, the fluidized contacting zones will usually comprise a hydrocarbon conversion zone for contact of the hydrocarbon feedstock with a granular mass of catalyst, and a regeneration zone where coke deposits are removed by combustion.

As the catalyst loses activity and a portion thereof becomes lost as fines, it becomes necessary to add fresh make-up catalyst to maintain the catalyst activity in the conversion zone at the desired level. It has been the practice to add fresh make-up catalyst by a periodic batch addition. Thus, the charge of fresh catalyst is added once daily in single portions, twice daily in two portions, or three times daily in three portions, etc. More recently, it has been found to be highly desirable to add fresh catalyst to the circulating catalyst system in smaller quantities at controlled rates. This latter mode of addition avoids a sudden change in activity of the average catalyst level in the system, reduces loss as fines, and prevents a temporary upset of the catalytic conversion zone.

A suitable means for introducing fresh make-up catalyst in a continuous manner is provided by the gravitational flow of fresh catalyst from a catalyst supply hopper which feeds fresh catalyst either to a flow line to the regeneration zone or to a return line from the regeneration zone by means of a mechanical flow regulating device. A flanged flow control spool with a central opening has been proposed for this purpose. In this manner the make-up catalyst, alone, or together with the regenerated catalyst is supplied to the main body of circulating catalyst through an opening of predetermined diameter, in a continuous manner so as to maintain the desired average catalyst activity of the system at an even level.

Since the quantity of make-up catalyst to be added through the opening in the flow regulating device is comparatively small, as in the order of 1 part in 5,000 to 10,000 of the hourly circulation rate, the size of the required opening is relatively small. For example, an opening having a diameter on the order of about one-half inch is required to achieve a uniform rate of catalyst addition to a catalytic cracking unit which requires about ten tons of fresh catalyst per day. The employment of an opening of this magnitude makes the system subject to frequent mechanical failures. Thus, the opening is very susceptible to plugging, and frequent bridging of the catalyst particles in the line results. Furthermore, various relatively small-sized impurities including a pebble, a piece of paper, a chip of wood, and the like can easily clog the one-quarter inch opening thereby interrupting the continuous flow of finely divided catalyst solids to the system. When this happens, it is imperative to remove the impurities and unclog the opening rapidly or the average catalyst activity of the system will drop below that desired.

The removal of clogging impurities from the flanged spool section is no simple matter. When the opening becomes clogged, it has been necessary to dismantle the entire spool section. Ordinarily, this involves unbolting the flanges which support the spool section sometimes as many as four times a day. It may take two men an hour to unbolt the flanges and eliminate the impurities from the clogged opening. Not only is this operation time-consuming, but the frequency of removal of the flow control spool section causes the bolts to wear out and requires their frequent replacement by pipefitters.

Meanwhile, the flow of solids is stopped for an extended period of time and the catalyst activity level is materially altered.

Summary of the invention

By the present invention an improved arrangement is provided for supplying finely divided make-up contact solids to the main body of circulating solids in a solids circulation system which permits the maintenance of solids activity at the desired level virtually without interruption.

In accordance with this invention, a vertically disposed supply hopper which contains finely divided solid particles, such as catalytic solids, communicates by means of a downflow transfer conduit with the particle inlet means of an open flow regulator housing. Disposed within the housing is a slidably movable gate. The gate is provided with a flow regulating channel for passage there through of finely divided solids in a continuous manner at a rate dependent upon the diameter of the channel. The channel is in substantial axial alignment with the inlet and outlet means of the housing for passage of the solid particles therethrough at a controlled rate. In this "flow control" position the channel provides a minimum operational flow path for the particulate material.

The flow regulating gate may be slidably moved from the flow path of the finely divided solids which enter the housing inlet means. In this "clean-up" position, a maximum operational flow path for the solids is provided so as to flush away any bridge of finely divided solids which may have formed above the gate.

The housing is also provided with high pressure gas inlet and outlet means substantially adjacent the aforesaid particle inlet and outlet means. When a plugging of the channel by impurities and/or catalyst particles occurs, the gate is slidably removed from the solids flow path to a position such that the channel is in substantial axial alignment with the high pressure gas inlet and outlet means. In this position the channel may be easily unplugged by a burst of a high pressure gas, such as air. As previously mentioned, when the gate is in the "clean-up" position, the maximum operational flow path is provided for the particulate material, and this flow path has a diameter which is substantially equivalent to that of the housing particulate material inlet means. Thus, the flow of solids is not interrupted while the apparatus of the subject invention is being unplugged and the solids activity of the entire system can be maintained substantially constant.

During actual operation, the finely divided solids pass through the channel portion of the gate at a predetermined rate, and then pass into the main body of the solids circulation system without interruption. Should a bridging by solid particles or a plugging of the channel occur, the gate may be slidably moved to the "clean-up" position by simply revolving a single handwheel and is unplugged according to the foregoing procedure. In the case of a circulating catalyst system, the finely divided catalyst solids are passed from the housing outlet means into a conduit which communicates with a catalyst regeneration zone. Through this conduit is passed a carrier gas, such as an oxygen-containing gas, into which the fresh-make-up catalyst from the flow-controlling channel is suspended and carried by the gas to subsequently become part of the main body of catalyst.

Thus, a particular advantage of the present improved solid particle feed control system is the provision of an easily maintainable flow control gate which may be unplugged in a quick and easy manner without interruption to the flow of particles. Whereas conventional flanged flow control units required about an hour or more for two men to remove, clean and replace the unit, the flow control means of this invention may be simply withdrawn from the flow-control position, cleaned and replaced by one man in a matter of seconds.

In addition to the great ease of maintenance which is made possible by the flow control device of this invention, the essential absence of interruption to the continuous flow of catalyst to the system permits an even greater control over the average catalyst activity of the system than was heretofore possible.

Description of the preferred embodiment

As previously discussed, the present arrangement may be desirably employed in the supplying of fresh make-up catalyst in a continuous manner to the main body of catalyst in a catalyst circulation system. The following description will be related to such a system.

Figure 1:
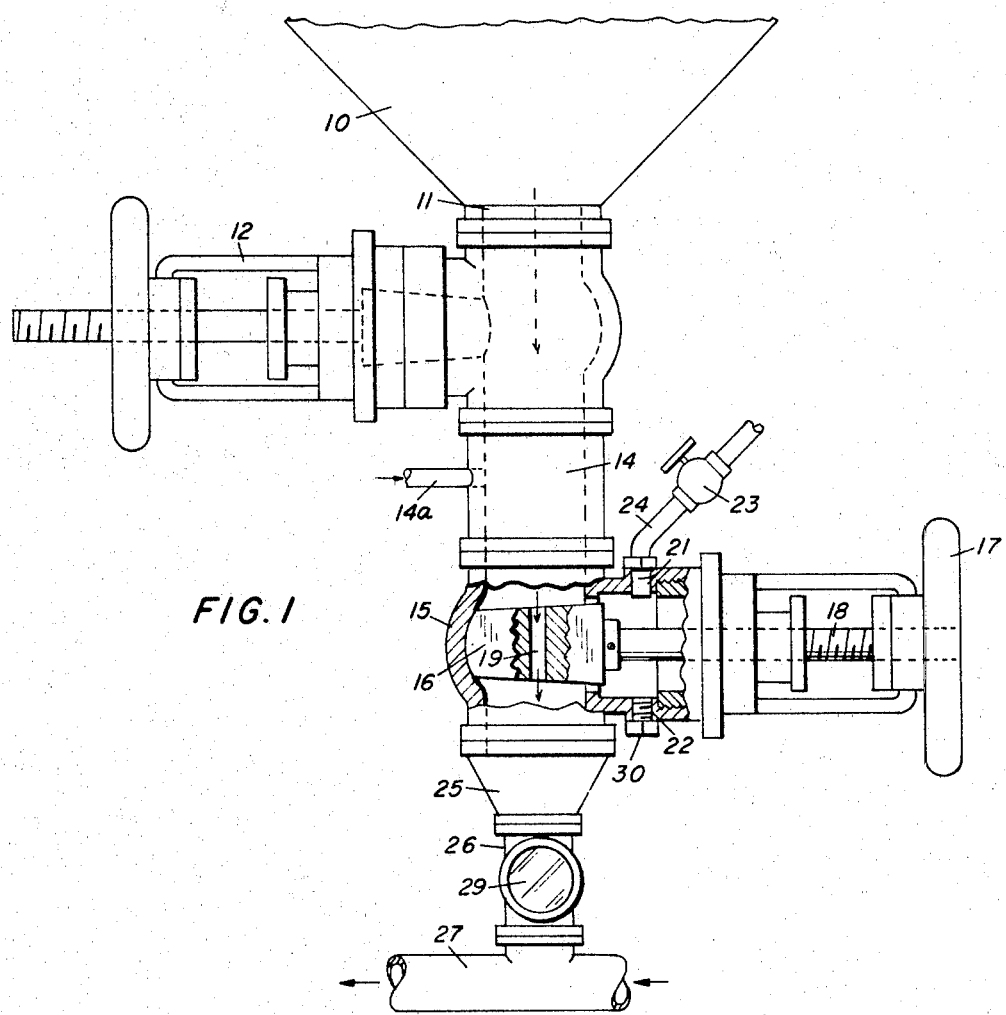
FIGURE 1 is an elevational view, partly in section of an arrangement for feeding make-up catalyst in accordance with the invention.

Referring particularly to the drawings, there is shown in FIG. 1 a funnel-shaped lower portion 10 of a catalyst storage hopper (not shown), which contains the finely divided make-up catalyst to be fed to the catalyst circulation system.

The make-up catalyst is discharged from the lower portion 10 of a catalyst supply hopper by means of a line 11, which is provided with a valve 12 for shutting off the supply of catalyst particles from the hopper when desired. When the valve 12 is open, the make-up catalyst passes into the line 14, whereby the catalyst is fed into the inlet end of the flow control housing 15.

The housing 15, which is depicted partly in section, is provided with a slidably mounted gate member 16 which may be moved at right angles to the direction of flow of the catalyst particles. By simply revolving the handwheel 17, the threaded spindle 18 which is fixedly attached to the gate member 16 is caused to advance or withdraw as desired.

The wedge-shaped gate member 16 is provided with an opening or channel 19, of circular cross-section which is preferably centrally located, and whose cross-sectional diameter determines the rate of flow of catalyst particles to the main body of the catalyst system. As shown in FIG. 1 the gate 16 is positioned with the flow path provided by channel 19 being axially aligned with the flow line 14, and accordingly, this position is termed the "flow control" position. When in this position, the gate member 16 is seated tightly within the housing 15, and the channel 19 provides the minimum operational flow path for the solid catalyst particles.

Conduit 14 is provided with an aeration tap 14a by means of which a gas, such as air, is introduced into the conduit 14 for the purpose of maintaining the downflowing catalyst particles in an aerated or fluidized state. This permits the solid particles to pass through the channel 19 more readily.

In practice, the size of opening 19 will depend upon the flow rate of catalyst particles that is required to maintain the desired activity level of the system. For example, a suitable channel diameter may be between about one-quarter inch and about one-half inch for catalyst particles having an average particle size of between about 20 and about 100 microns. The relatively small opening in the channel 19 is conducive to the plugging or bridging of the catalyst particles above the gate member 16. This "bridging" of the catalyst may be obviated by sliding the gate member 16 to the position shown in FIG. 2.

Figure 2:
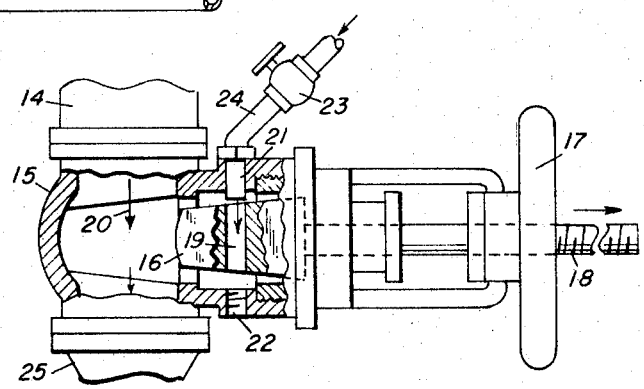
FIGURE 2 is a fragmentary view partly in section of the arrangement of FIGURE 1.

Referring now to FIG. 2, the housing 15 is shown in section with the gate member 16 withdrawn from a position of axial alignment of the channel 19 with the conduit 14. In this "clean-up" position the maximum rate of flow of catalyst particles is permitted to flow through the conduit 14 and flow path 20. This flow of catalyst solids is sufficient to flush out any bridge of catalyst solids which may have formed. The flow path 20 that is provided in FIG. 2 has a diameter which is substantially equivalent to that of the conduit 14.

While the bridging or plugging caused by the catalyst particles above the gate member 16 may be removed by the flushing effect of the maximum catalyst particle flow, the channel 19 may become plugged by catalyst particles and/or some impurity which must be removed before the flow control gate can be placed in operation. As shown in FIG. 2, the gate member 16 has been slidably positioned with the channel 19 being axially aligned with a high pressure gas inlet and outlet means 21 and 22, respectively. When it is desired to unplug the channel 19, a valve 23 is opened and a burst of high pressure gas, such as air, from a high pressure gas source (not shown) is sent by means of the line 24 and inlet 21 through the channel 19 and is discharged along with the plug causing bodies by means of the outlet 22. As depicted in FIG. 2 the gate member 16 is referred to as being in a "clean-up" position, i.e, with the gate 16 substantially withdrawn from the flow path 20, and, in addition, the channel 19 is axially aligned with the high pressure gas inlet and outlet means 21 and 22.

As is apparent from viewing FIG. 2, the positioning of the channel 19 in the manner shown for "clean-up" permits a direction concentration of high pressure gas upon the plug causing matter, which insures its effective removal. The high pressure gas inlet and outlet means 21 and 22 are illustrated as being adjacent the particulate material inlet and outlet means, respectively. However, the inlet and outlet means may be reversed with inlet means 21, gas line 24 and valve 23 being placed adjacent the particulate material outlet means, and the outlet means 22 being placed adjacent the particulate material inlet means. In this manner the high pressure gas is injected through the channel 19 in a direction which is opposite to that from which the plugging material became lodged in the channel. In some instances, e.g., with large-size debris, this arrangement may be preferable.

During the operation of the arrangement of the present invention, the flow of catalyst particles is monitored by observing the continuously-flowing particles through the sight glass 29. When the first indication of catalyst hold-up due to bridging and/or a plugging of the channel 19 is observed, i.e. by little or no flow of catalyst particles past the sight glass 29, the hand-wheel 17 is rotated to slidably move the gate member 16 to the "clean-up" position as shown in FIG. 2. This permits the maximum operational flow of catalyst particles through the flow path 20. If the channel 19 is not clogged, the placement of the gate 16 in the clean-up position is sufficient to remove the particle bridge that has formed, and the gate may be then returned to the flow control position. However, if it is observed that there is still little or no catalyst flow when the gate 16 is in the latter position, then the gate 16 must be returned to the clean-up position and an optional closure means 30, which is shown as a threaded bolt, is removed. Next, a burst of high pressure gas is sent issuing through the channel 19 by opening the valve 23.

After the obstruction has been removed from the channel 19, valve 23 is closed and the gate member 16 is slidably returned to the "flow control" position depicted in FIG. 1 by rotating the hand-wheel 17.

Referring again to FIG. 1, the catalyst particles during actual operation will gravitate downwardly through conduits 11 and 14 to the housing 15. The catalyst particles pass through channel 19 at a predetermined rate dependent on the diameter of the channel. Thereafter, the catalyst particles freely gravitate through the truncated-conical flow section 25 and the sight-glass section 26. The catalyst particles become entrained in a suspending gas upon entering conduit 27, such as air, which is passed through conduit 27 in the flow direction indicated in FIG. 1.

Since the carrier gas is under pressure, it is necessary to provide a high gas pressure on the gravitating solids in the direction of flow of the catalyst particles when employing the arrangement shown in FIG. 1. This prevents any adverse pressure gradient from affecting the flow of the catalyst particles through the channel 19.

Accordingly, in practice, the fresh catalyst supply hopper is pressured to about 23 to 25 p.s.i. with air which may be from the discharge of the air blowers which are used in fluidizing the catalyst in the regenerator. This pressure, plus that resulting from the weight of the catalyst in the hopper, is sufficient to insure a positive flow of the catalyst through the channel 19 into the transport line 27.

Ths suspended catalyst particles in line 27 are passed on to become part of the main body of catalyst in the catalyst circulating system. For example, they may be delivered to a catalyst regeneration zone or to the reaction zone (not shown) previously mentioned.

Thus, it may be seen that the entire operation may be simply and quickly conducted without the use of tools and with no interruption to the continuous flow of catalyst. In this way the average catalyst activity may be maintained at a substantially constant level.

While the present invention has particular application for the introduction of a controlled amount of fresh make-up cracking catalyst to the circulating body of catalyst in a catalytic cracking operation, it is to be understood that the invention may be suitably adapted to be employed for use in any process where it is necessary to introduce contact particles into a system with virtually no interruption to the process or system.

Obviously, many modifications and variations of the invention as hereinabove set forth may be made without departing from the spirit and scope thereof, and therefore only such limitations should be imposed as are indicated in the appended claims.

I claim:

1. Apparatus for continuously adding make-up contact solids to a solids circulation system in uninterrupted flow which comprises a vertically disposed fresh solids storage hopper means for holding a batch of finely divided solids to be introduced at a substantially constant rate to the system, conduit means for discharging finely divided solids from said hopper means communicating with a lower portion of said hopper, a flow regulating means having a flow control position and a clean-up position, comprising an open housing means having particulate material inlet and outlet means, said inlet means communicating and in substantial axial alignment with said conduit means, said housing being additionally provided with high pressure gas inlet and outlet means positioned adjacent said particulate material inlet and outlet means, a slidably mounted gate means provided within said housing, said gate means having a channel therethrough, said channel providing a minimum operational flow path for the particulate material, said channel means being in axial alignment with said particulate material inlet and outlet means in the flow control position, said channel means being in axial alignment with said high pressure gas inlet and outlet means in the clean-up position, and said clean-up position providing a maximum operational flow path for the particulate material.

2. Apparatus according to claim 1 wherein an aeration tap for maintaining the finely divided solids in motion is provided in the conduit means connecting the lower portion of the hopper means with the housing inlet means.

3. Apparatus according to claim 1 wherein the gate is slidably movable from the flow control position to the clean-up position by the rotation of a handwheel.

4. Apparatus according to claim 1 wherein the channel means is centrally located within the gate.

5. Apparatus according to claim 1 wherein the gate is wedge-shaped.

6. A flow regulating device for providing uninterrupted flow control positon, said channel means being in axial said device having a flow control position and a clean-up position, which comprises an open housing means having particulate material inlet and outlet means, said housing being additionally provided with high pressure gas inlet and outlet means positioned adjacent said particulate material inlet and outlet means, a slidably mounted gate means provided within said housing, said gate means having a channel therethrough, said channel providing minimum operational flow path for the particulate material, said channel means being in axial alignment with said particulate material inlet and outlet means in the flow control position, said channel means being in axial alignment with said high pressure gas inlet and outlet means in the clean-up position, and said clean-up position providing a maximum operational flow path for the particulate material.

7. The device of claim 1 wherein the gate is slidably movable from the flow control position to the clean-up position by the rotation of a handwheel.

8. The device of claim 1 wherein the channel means is centrally located within the gate.

9. The device of claim 1 wherein the gate is wedge-shaped.

10. A flow path regulating device for providing uninterrupted flow of solid particulate material at a predetermined rate, which comprises an open housing means having a particulate material inlet and outlet means, a slidably mounted wedge-shaped gate means provided within said housing means, said gate means having a channel therethrough, said channel providing a minimum operational flow path for the particulate material, said channel means being in axial alignment with said particulate material inlet and outlet means in a flow control position, said gate means being substantially withdrawn from the particulate material flow path in a clean-up position, clean-up means at said clean-up position for removing plugging material from within said channel means, and said clean-up position providing a maximum operational flow path for the particulate material.

11. The device of claim 10 wherein said housing means is provided with high pressure gas inlet and outlet means positioned adjacent said particulate material inlet and outlet means, and said channel means being in axial alignment with said high pressure gas inlet and outlet means in the clean-up position.

References Cited

UNITED STATES PATENTS

| 1,297,446 | 3/1919 | Collins | 251—117 |
| 2,283,556 | 5/1942 | Karrick | 137—240 |
| 2,485,316 | 10/1949 | Robbins et al. | 137—240 |

ANDRES H. NIELSEN, *Primary Examiner.*

US. Cl. X.R.

137—240; 251—117

UNITED STATES PATENT OFFICE
CERTIFICATE OF CORRECTION

Patent No. 3,428,366                      February 18, 1969

Charles H. Harvey

It is certified that error appears in the above identified patent and that said Letters Patent are hereby corrected as shown below:

Column 4, line 66, "direction" should read -- direct --. Column 6, line 42, "control position, said channel means being in axial" should read -- of solid particulate material at a predetermined rate --; line 66, after "flow" cancel "path".

Signed and sealed this 24th day of March 1970.

(SEAL)
Attest:

Edward M. Fletcher, Jr.
Attesting Officer

WILLIAM E. SCHUYLER, JR.
Commissioner of Patents